Patented Aug. 17, 1954

2,686,789

UNITED STATES PATENT OFFICE 2,686,789

METHOD OF INTRODUCING A MALONYL RADICAL IN δ-POSITION TO A CARBONYL RADICAL IN STEROIDS AND 1,2,3,4,7,8,9,10-11,12,13,14,16,17-TETRAHYDRO-15H-CYCLOPENTA[a] - PHENANTHREN - 7 - ONE - 3 - MALONATES PRODUCED THEREBY

Jack W. Ralls, Morton Grove, Ill., assignor to G. D. Searle & Co., Chicago, Ill., a corporation of Illinois No Drawing. Application March 20, 1952, Serial No. 277,733

8 Claims. (Cl. 260—397.1)

The present invention relates to a method of introducing a malonyl radical in δ-position to a carbonyl radical and, more particularly, to the addition of a metallo derivative of a lower aliphatic type of ester of malonic acid, to an α,β,γ,δ-di-unsaturated ketone and the products produced thereby.

The over all process and the probable intermediates formed therein can be represented schematically as follows:

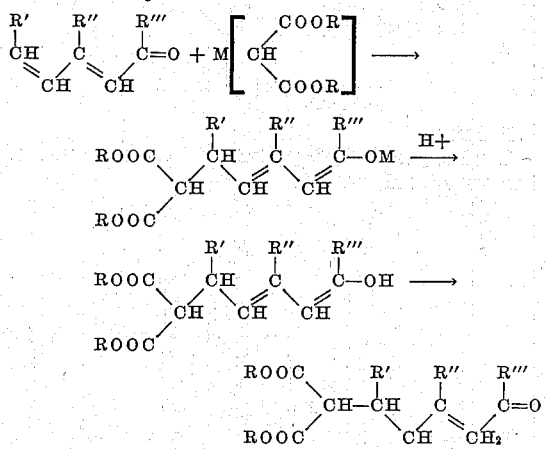

In this formula M is an alkali metal radical, R is a lower aliphatic radical, and R', R" and R''' are parts of an otherwise saturated bicyclic fused ring system and, particularly, parts of a hexahydronaphthalene ring. Of special interest are systems in which this hexahydronaphthalene ring is a part of a polyhydrocyclopenta[a]phenanthrene nucleus. In that case the over all reaction can be represented as follows:

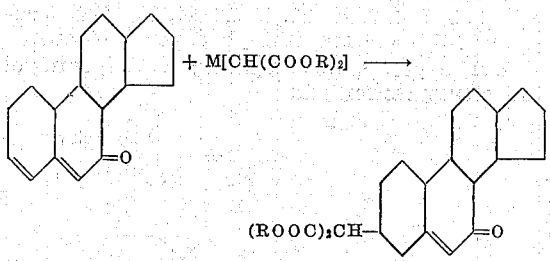

M being an alkali metal atom such as lithium, sodium and potassium and R being a lower alkyl radical such as methyl, ethyl, propyl or a lower phenylalkyl radical such as benzyl and phenethyl.

Of special pharmaceutical utility, particularly in the production of steroidal hormonal effects and of hydrocholeresis, are the lower aliphatic esters of 7-oxo-10,13-dimethyl-(1,2,3,4,7,8,9,10,-11,12,13,14,16,17 - tetradecahydro - 15H) - cyclopenta[a]phenanthrene-3-malonic acids carrying, as additional substituents attached to the 17-position, a lower alkyl or acyl radical.

The condensation reaction is conducted conveniently by heating under anhydrous conditions of a solution of a lower alkali metal alkoxide, preferably a methoxide or ethoxide, in a lower alkanol with the malonate and a substantial equivalent of a 1,2,7,8,9,10,11,12,13,14,16,17-dodecahydro - 15H - cyclopenta[a]phenanthren-7-one. The sodium salt is then treated with dilute aqueous acid and the ketonic product extracted with an organic solvent. Purification by chromatographic methods, using such adsorbents as silica gel has been found useful.

The esters can be dealkylated in the conventional manner using alkali. The resulting 7-oxo - 1,2,3,4,7,8,9,10,11,12,13,14,16,17 - tetradecahydro - 15H - cyclopenta[a]phenanthrene - 3 - malonic acids are useful intermediates for the preparation of the hitherto unavailable 7-oxo-1,2,3,4,7,8,9,10,11,12,13,14,16,17 - tetradecahydro-15H - cyclopenta[a]phenanthrene - 3 - acetic acids which are obtained by destructive distillation of the malonic acids with loss of carbon dioxide.

Derivatives useful in the identification of these esters of the 7-oxo-1,2,3,4,7,8,9,10,11,12,13,14,16,-17 - tetradecahydro - 15H - cyclopenta[a]phenanthrene-3-malonic acids are the 7-ethylene mercaptoles which are obtained by treatment of the malonate with an aryl sulfonic acid and then with ethanedithiol.

The following experimental part describes in detail the manner of conducting the process of this invention. However, it is not to be construed as limited in spirit or in scope by the experimental details presented since it will be apparent to those skilled in the art that many modifications in materials and methods may be practiced without departing from the invention. Temperatures are given in degrees centigrade (° C.), relative amounts of materials in parts by weight, and pressures in millimeters (mm.) of mercury.

EXAMPLE 1

*Diethyl ester of 7-oxocholesteryl-3-malonic acid*

To a solution of sodium ethoxide in ethanol prepared from 460 parts of sodium and 7000 parts of ethanol, there is added a solution of 3210 parts of diethyl malonate and 7640 parts of 3,5-cholestadien-7-one (cf. Stavely and Bergmann, Journal of Organic Chemistry, volume 1, pages 567 and 575: 1936) in 10,000 parts of ethanol. The mixture is heated under reflux in a nitrogen atmosphere for 90 minutes and, after standing at room temperature for 48 hours, the reaction mixture is poured into 30,000 parts of water containing 2000 parts of acetic acid. The product is extracted with chloroform and the extract is washed with water, dilute sodium bicarbonate solution and again with water. The chloroform solution is then dried over anhydrous sodium sulfate, filtered, and the filtrate is evaporated. The resulting mixture is readily separated chromatographically, using silica gel as the adsorbent. The ethyl 7-oxocholesteryl-3-malonate crystallizes from 95% ethanol in small needles melting at about 106–107° C. It has the structural formula

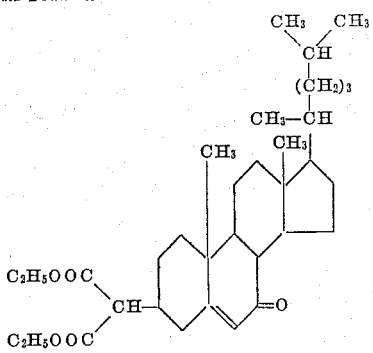

EXAMPLE 2

*Diethyl ester of 7-oxocholesteryl-3-malonic acid 7-ethylene mercaptole*

A solution of 570 parts of the diethyl ester of 7-oxocholesteryl-3-malonic acid and 250 parts of p-toluene sulfonic acid monohydrate in 5000 parts of acetic acid is treated at room temperature by addition of 200 parts of ethanedithiol. After a few minutes a crystalline precipitate forms which is collected on a filter, washed with methanol and dried. The diethyl ester of 7-oxocholesteryl-3-malonic acid 7-ethylene mercaptole melts at about 169–171° C. and has the structural formula

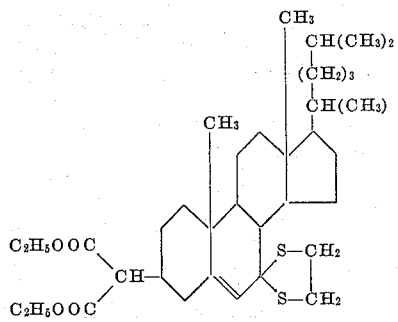

EXAMPLE 3

*7-oxocholesteryl-3-malonic acid*

To a solution of 1000 parts of potassium hydroxide in 5000 parts of water and 15,000 parts of methanol, 470 parts of the diethyl ester of 7-oxocholesteryl-3-malonic acid are added. The mixture is heated under reflux for one hour in a nitrogen atmosphere, cooled and treated with ether and water. The ether layer is separated and extracted with water and the aqueous solutions are combined; this ether layer, after drying and evaporation, yields 3,5-cholestadien-7-one. The basic aqueous solution is cooled in an ice bath and acidified with 6-$\underline{N}$ sulfuric acid whereupon the 7-oxocholesteryl-3-malonic acid precipitates. The precipitate is collected on a filter and crystallized from a mixture of acetic acid and water. Pale yellow crystals are obtained which melt at about 192° C. with evolution of carbon dioxide.

EXAMPLE 4

*7-oxocholesteryl-3-acetic acid*

A dry round bottom flask fitted with a distillation head is charged with 138 parts of 7-oxocholesteryl-3-malonic acid and heated in a Wood's metal bath at a pressure of 0.05 mm. of mercury. The temperature is raised to 195° C. at which point a vigorous evolution of carbon dioxide occurs. After heating at 195–200° C. for 15 minutes the flask is cooled, whereupon the 7-oxocholesteryl-3-acetic acid solidifies. Recrystallized from methanol it melts at 167–169° C. This acid has the structural formula

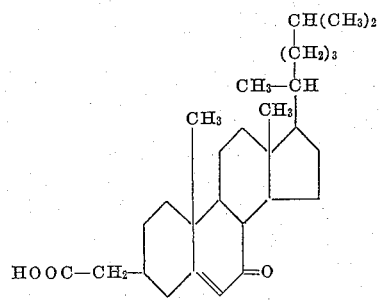

I claim:

1. The process of preparing a compound of the structural formula

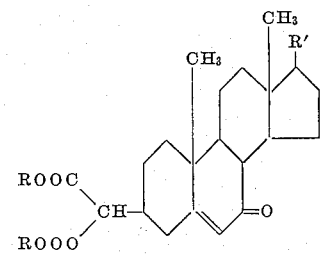

wherein R is a member of the class consisting of lower alkyl and lower phenylalkyl radicals and R' is a lower alkyl radical which comprises heating, under anhydrous conditions, of a metallomalonate of the structural formula

ROOC—CHM—COOR wherein R is defined as hereinabove and M is an alkali metal atom with a substantial equivalent of a 1, 2, 7, 8, 9, 10, 11, 12, 13, 14, 16, 17-dodecahydro-15H-cyclopenta[a]-phenanthren-7-one.

2. The process of preparing a compound of the structural formula

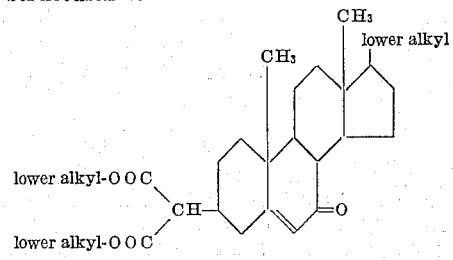

which comprises heating of an anhydrous alcoholic solution of a lower alkoxide of an alkali metal and a lower alkyl ester of malonic acid with a substantial equivalent of a 10, 13-dimethyl-17-lower alkyl-1, 2, 7, 8, 9, 10, 11, 12, 13, 14, 16,17 - dodecahydro - 15H - cyclopenta[a]phenanthren-7-one.

3. The process of preparing a compound of the structural formula

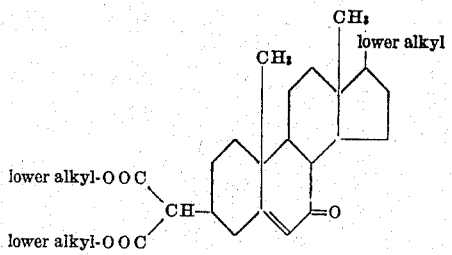

which comprises heating of an anhydrous alcoholic solution of sodium and a lower dialkyl ester of malonic acid with a substantial equivalent of a 10,13-dimethyl-17-lower alkyl-1,2,7,8,9,10,11,12, 13,14,16,17 - dodecahydro - 15H - cyclopenta[a]phenanthren-7-one.

4. The process of preparing a compound of the structural formula

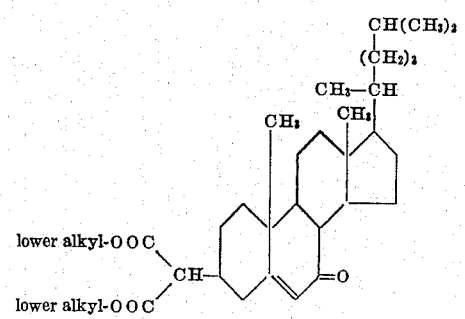

which comprises heating of an anhydrous alcoholic solution of sodium and a lower dialkyl ester of malonic acid with a substantial equivalent of a 10,13 - dimethyl - 17-(α-methylisoheptyl) -1,2,7,8, 9,10,11,12,13,14,16,17 - dodecahydro - 15H - cyclopenta[a]phenanthren-7-one.

5. A compound of the structural formula

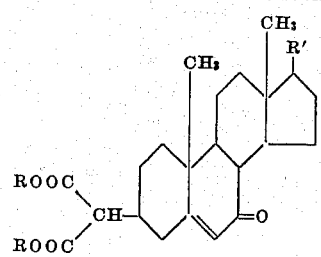

wherein R is a member of the class consisting of lower alkyl and lower phenylalkyl radicals and R' is a lower alkyl.

6. A compound of the structural formula

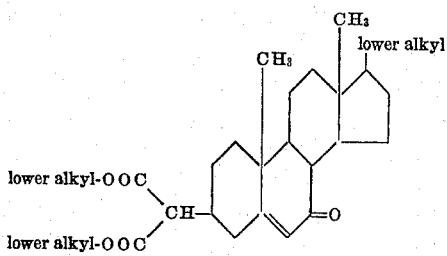

7. A compound of the structural formula

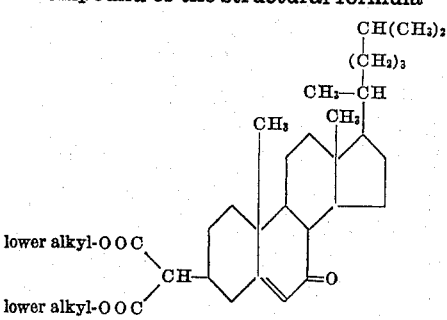

8. A compound of the structural formula

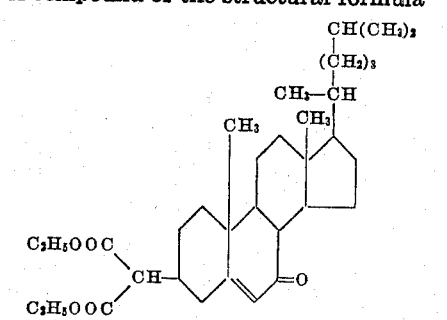

References Cited in the file of this patent
UNITED STATES PATENTS

| Number | Name | Date |
| --- | --- | --- |
| 2,592,036 | Kaiser | Apr. 8, 1952 |